(12) United States Patent
Parker

(10) Patent No.: US 8,554,371 B2
(45) Date of Patent: Oct. 8, 2013

(54) VISION AIDED CASE/BULK PALLETIZER SYSTEM

(75) Inventor: Jonathon D. Parker, Sylvania, OH (US)

(73) Assignee: Kaufman Engineered Systems, Waterville, OH (US)

(*) Notice: Subject to any disclaimer, the term of this patent is extended or adjusted under 35 U.S.C. 154(b) by 304 days.

(21) Appl. No.: 12/733,033

(22) PCT Filed: Sep. 30, 2008

(86) PCT No.: PCT/US2008/011301
§ 371 (c)(1),
(2), (4) Date: Feb. 2, 2010

(87) PCT Pub. No.: WO2009/045390
PCT Pub. Date: Apr. 9, 2009

(65) Prior Publication Data
US 2010/0185329 A1    Jul. 22, 2010

(51) Int. Cl.
*G05B 19/00* (2006.01)
(52) U.S. Cl.
USPC .......... 700/259; 700/213; 700/217; 700/245; 700/254; 700/258
(58) Field of Classification Search
None
See application file for complete search history.

(56) References Cited

U.S. PATENT DOCUMENTS

| | | | | |
|---|---|---|---|---|
| 4,907,695 A * | 3/1990 | Gomes et al. | | 206/386 |
| 5,293,322 A * | 3/1994 | Yagi et al. | | 700/217 |
| 6,167,607 B1 * | 1/2001 | Pryor | | 29/407.04 |
| 6,209,709 B1 * | 4/2001 | Ouellette | | 198/468.8 |
| 6,314,631 B1 * | 11/2001 | Pryor | | 29/407.04 |
| 6,658,816 B1 * | 12/2003 | Parker et al. | | 53/397 |
| 7,559,737 B2 * | 7/2009 | Ray et al. | | 414/792.9 |
| 2005/0273199 A1 * | 12/2005 | Ban et al. | | 700/248 |
| 2007/0073439 A1 * | 3/2007 | Habibi et al. | | 700/213 |
| 2007/0112465 A1 * | 5/2007 | Sadighi et al. | | 700/254 |
| 2008/0092488 A1 * | 4/2008 | Gabrielsen et al. | | 53/428 |
| 2009/0000415 A1 * | 1/2009 | Parker | | 74/490.01 |
| 2009/0069939 A1 * | 3/2009 | Nagatsuka et al. | | 700/258 |
| 2010/0185329 A1 * | 7/2010 | Parker | | 700/259 |

* cited by examiner

*Primary Examiner* — Khoi Tran
*Assistant Examiner* — Jonathan L Sample
(74) *Attorney, Agent, or Firm* — Emch, Schaffer, Schaub & Porcello Co. L.P.A.

(57) ABSTRACT

The vision aided case/bulk palletizer system of this invention is a process and apparatus for: providing a camera positioned over the dunnage supply line; initiating a frame grab of the dunnage supply line with the camera; using the frame grab to determine the position of the dunnage; using the frame grab to position the programmable robot over the dunnage; feeding the dunnage from the dunnage supply line to the load building area; and controlling the steps with the single programmable robot, microprocessor and software. This system provides for transfer of the dunnage when the position of the dunnage is skewed by using the frame grab to position the programmable robot over the skewed dunnage. In another embodiment, the camera is used to determine any void in the tier of product during the build of a tier of product, and also provides for error-proofing the transfer of dunnage.

33 Claims, 5 Drawing Sheets

VISION AIDED CASE/BULK PALLETIZER SYSTEM

TECHNICAL FIELD

This invention relates to a case/bulk system for palletizing a load including a multiaxis programmable robot. In one embodiment, the invention relates to innovative use of a camera for transferring bulk product bottle(s) or cases of product. In a preferred embodiment, the camera is especially useful in the dunnage supply line.

BACKGROUND OF THE INVENTION

In the recent past, customers purchased machines to palletize bulk loads of empty containers that were semi-automatic. These machines required manual placement of tier sheets and top frames. More recently, fully automatic palletizers were introduced that took the manual placement of tier sheets and top frames to an automatic function of the machine. The convention non-robotic bulk palletizer consists of many frames joined together occupying horizontal and vertical space much greater than our invention. Space is cost to a manufacturer.

A recent invention is the integration of equipment that will form a tier of containers, stack the tiers of containers, place pallets, tier sheets, and top frames and prepare the load for strapping and removal to the warehouse. See U.S. Pat. No. 6,658,816 assigned to Kaufman Engineered Systems, Inc., which herein is incorporated by reference.

Specifically, the patented invention for bulk palletizing containers is comprised of a tier staging area, a programmable robot with cantilevered arm and end-of-arm tool, a tier sheet station, a pallet station, a top frame station, and a load build area. The end-of-arm tool incorporates that full tier pickup, tier sheet pickup, pallet pickup, and top frame pickup. The single robot will perform all functions in the sequence. The patented invention uses a robot to gather the tier of containers and carry it to the load build area for stacking the tiers. The invention uniquely includes a programmable robot with cantilvered arm as a single end of arm tool for placing pallets, tiers of containers, tier sheets and top frames in the load build area.

Recent inventions to case/bulk palletizer systems have made great strides in the industry using innovative end-of-arm tools (EOAT) on the cantilevered arm of robots. This invention is aimed at making further improvements using vision aided systems. Infrequently, the dunnage in the dunnage supply line may be skewed and the EOAT may not transfer the donnage properly. Infrequently, the tier of bulk/case product may contain a void resulting in the tier of product being rejected.

BRIEF DESCRIPTION OF THE INVENTION

The vision aided case/bulk palletizer system of this invention is a process and apparatus for: providing a camera positioned over the dunnage supply line; initiating a frame grab of the dunnage supply line with the camera; using the frame grab to determine the position of the dunnage; using the frame grab to position the programmable robot over the dunnage; feeding the dunnage from the dunnage supply line to the load building area; and controlling the steps with the single programmable robot, microprocessor and software.

This system provides for proper transfer of the dunnage when the position of the dunnage is skewed. The controlling is configured to use the frame grab to position the programmable robot over the skewed dunnage.

The system also provides for "error proofing" the proper transfer of dunnage. The system may be used to error proof each layer of dunnage, i.e. pallets, tier sheets, top frames and the like. The system also can error proof the load being built.

In another embodiment, the camera is used to determine any void in the tier of product during the build of a tier of product. This is especially useful in the building of a row of product on a layer formation table. In this way, any void is detected before the tier of product is used to build a load in a load building area.

Other objects and advantages of the present invention will become apparent to those skilled in the art upon a review of the following detailed description of the preferred embodiments and the accompanying drawings.

DETAILED DESCRIPTION OF THE INVENTION

The vision aided system of this invention includes a process for palletizing a load comprising the steps of providing a dunnage supply line; providing a load building area; providing a single programmable robot including a microprocessor and software configured to build a load by sequentially feeding dunnage from the dunnage supply line as necessary to the load building area; providing a camera positioned over the dunnage supply line; initiating a frame grab of the dunnage supply line with the camera; using the frame grab to determine the position of the dunnage; using the frame grab to determine the position of the dunnage; using the frame grab to position the programmable robot over the dunnage; feeding the dunnage from the dunnage supply line to the load building area; and controlling the steps with the single programmable robot, microprocessor and software.

In a preferred embodiment, the microprocessor and software are configured to:

Use the vision system to identify the location and quality of a pallet,

Use the vision system to identify the location and quality of a top frame,

Use the vision system to identify the location and quality of a tier sheet,

Use the vision system to identify the location and quality of a tier of bottles, Use the vision system to identify the location and quality of a tier of cases, Use the vision system to error-proof the location of a pallet, Use the vision system to error-proof the location of a top frame, Use the vision system to error-proof the location of a tier sheet, Use the vision system to error-proof the quantity of bottles in a tier of bottles, Use the vision system to error-proof the location of each bottle in a tier of bottles, Use the vision system to error-proof the shape of a tier of bottles, Use the vision system to error-proof the quantity of cases in a tier of cases, Use the vision system to error-proof the location of a case in a tier of cases, Use the vision system to error-proof the shape of a tier of cases.

Figure 1:
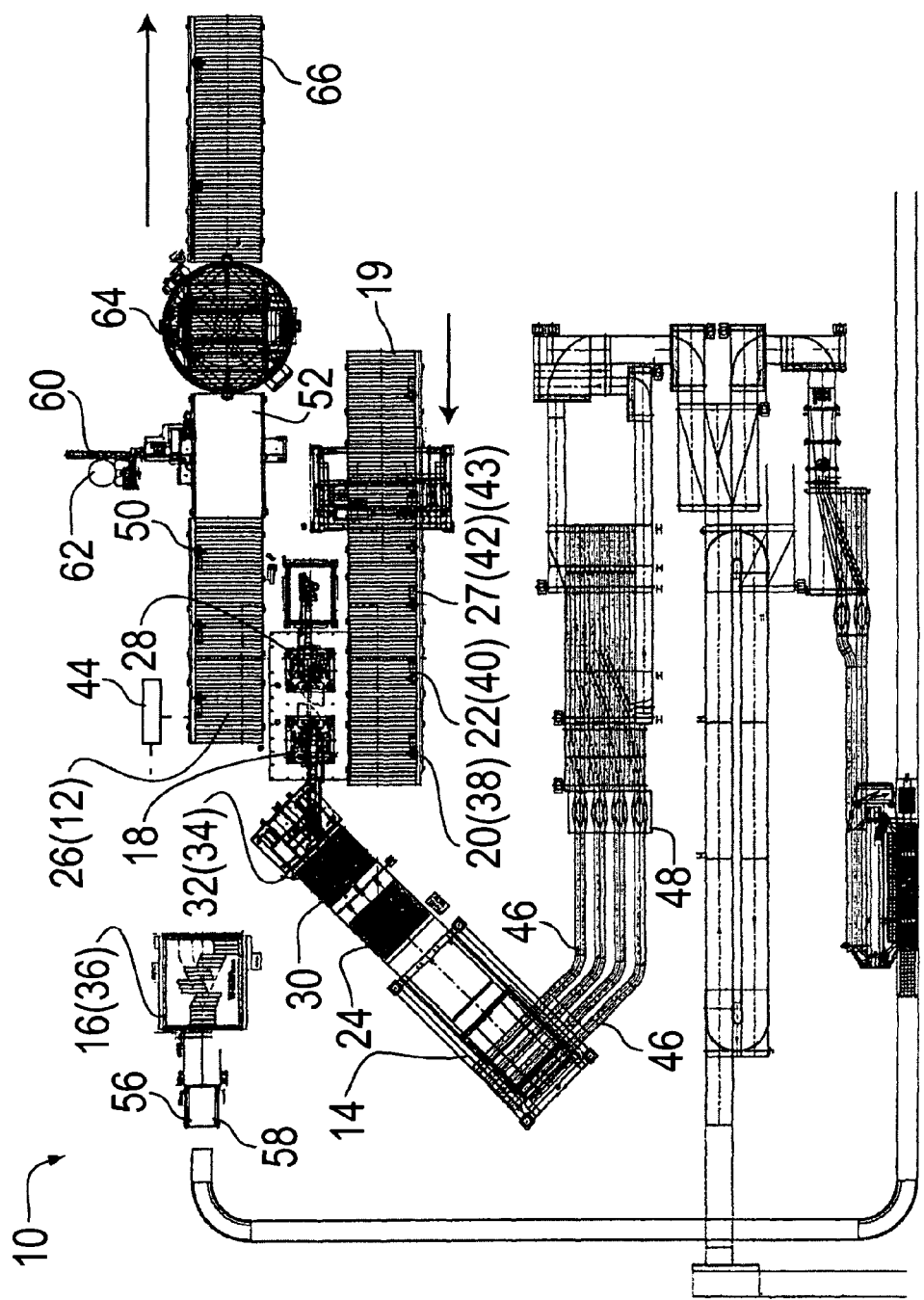
FIG. 1 is a top schematic view showing a packaging system in which the apparatus of this invention may be used.

FIG. 1 shows system 10 for packaging load 12 comprising bulk product feeder 14, tier case station 16 and programmable, articulate robot 18. Dunnage supply line 19 feeds system 10. System 10 also includes pallet station 20, tier sheet station 22, tier staging area 24, load build area 26, top frame station 27, programmable, articulate, robot 28 and tier pick up area 30. Robot 18 is a single means for placing tiers 32 of the bulk product 34 or cases 36 in load build area 26. Robot 28 is a single means for placing pallets 38, tier sheets 40 and top frame 42 in load build area 26. Robot 18 picks up tier 32 at tier pickup area 30 and discharges it at load build area 26.

In one embodiment, robot 18 picks up case 36 from tier case station 16 and places them in load building area 26. The two robot system provides flexibility in that the line can still run if one side is down for repair, maintenance or product set up. In this embodiment, robot 28 picks up top cap 43 instead of top frame 42. Pallets, tiers, tier sheets, top frames and top caps often are referred to as dunnage.

Bulk product feeder 14 typically comprises a multiplicity of parallel conveyor belts 45 which carry rows of bulk product 34 (bottles). Frame 48 support belts 46. The rows are fed to the tier staging area 24. Tier staging area 24 typically includes a conveyor which comprises frames and supporting feed belts. Usually tier staging area 24 is at the end of bulk product feeder 14.

Tier case station 16 typically comprises a multiplicity of parallel conveyor belts 56 which carry cases 36 of product 34 (bottles). Frame 58 support belts 56. The cases are fed to load build area 26 for pick up by robot 18.

Cases as used herein may vary widely. Typically cases means a case of 24 beer bottles. Cases may include a 6 pack, 12 pack, 18 pack, 30 pack and the like. The case may be corregated cases, chip board cases or film wrapped bundles of product. A typical film wrapped case is a film wrapped package of six or twelve rolls of paper towels.

Tier sheet station 22 comprises conveyor which includes a frame supporting rollers. Tier sheet station 22 is next to pallet station 20 and also parallel to load build area 26. Robot 28 picks up pallet 38 from pallet station 20 and locates it at load build area 26. This is followed sequentially by alternating layers of tier sheet 40 and tier 32 (cases 36). In one embodiment where no pallet 38 is employed, the first layer is tier sheet 40.

The rows of product 34 form tier 32 on a conveyor. The conveyor then transports tier 32 to tier staging area 24. As will be shown later, tier 32 is located in load build area 26 by robot 18. Dunnage supply line 19 provides pallets 38 to pallet station 20 and top frames 42 to top frame station 28. Line 19 feeds to stations 20 and 28. Pushers such as chain transfers 54 and 56 move pallets 38 and top frames 42 to stations 20 and 28, respectively.

Pallet station 20 comprises conveyors which includes frames supporting a multiplicity of rollers. Pallet station 20 usually is near load build area 26. Tier sheet station 22 comprises conveyors, frames and a multiplicity of rollers.

Dunnage line 19 comprises conveyors which includes frames supporting a multiplicity of rollers.

Top frame station 28 comprises conveyors which includes a frame supporting a multiplicity of rollers.

When the tier comprises cases 36, top frame station 28 feeds top caps 43 instead of top frames 42.

Load conveyor 50 removes load 12 from load building area 26. Conveyor 50 comprises frames and rollers. Typically, conveyor 50 transfers load 12 strapping area 52.

FIG. 1 also shows control 44, which may be a programmable logic controller (PLC), and power control panel to operate system 10 through conventional circuitry not shown. Control 44 controls robot 18 and robot 28 and co-ordinates their operation with dunnage line 19, feeder 14 and station 16.

PLC's in a control panel controls system 10, the load and dunnage conveying system. The PLC's in the control panel controls the tier building system. PLC's interface with the control, which controls robot 18 and robot 28. PLC's also interfaces with other PLC's and is the main control for system 10. Power control panels are wired to their respective drives and sensors and actuators.

FIG. 1 also shows strapper 60 which straps load 12. Control 62 controls strapper 60. While strapping preferably is used for bulk product 34, strapping may be with cases 36 as well. Orienting station 64 turns load 12 after a first strapping and sends load 12 back to station 60 for a second strapping perpendicular to the first. Load 12 then moves down conveyor 66 to storage or shipping.

Figure 2:
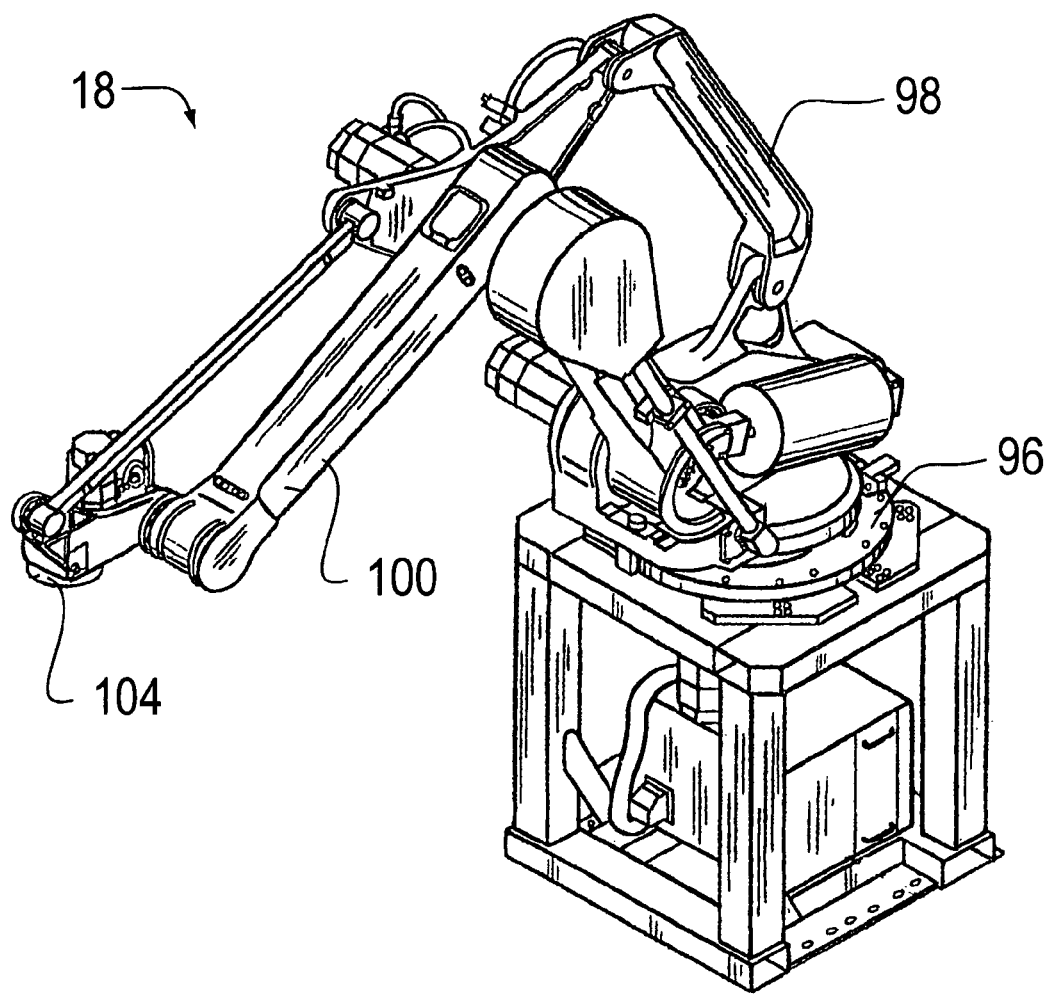
FIG. 2 is a perspective view of a programmable multi-axis robot used with this invention.

FIG. 2 shows robot 18 or 28 in greater detail. For this drawing, robot 18 will be used to illustrate either robot. Robot 18 mounts on main rotary axis 96 and can rotate 360° about axis 96. Robot 18 also includes main support post 98 extending vertically from axis 96. Cantilevered arm 100 extends from post 98 and carries end effector 102. Effector 102 is capable of locating tiers 32 or cases 36 into load building area 26 to build load 12.

A distal end of cantilevered arm 100 carries mounting plate 104. Plate 104 attaches to arm 100 with conventional fasteners and end effector 102 attaches to plate 104 with similar mechanical fasteners.

Robot 18 is a programmable multi-axis robot. Previously discussed controllers controls robot 18. Typically the multi-axis robot 18 has five axes of motion. In another embodiment arm 100 may be a Cartesian arm.

Figure 3:
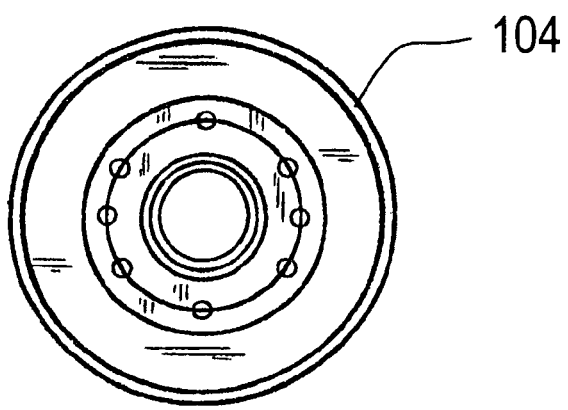
FIG. 3 shows the mounting plate of the robot of FIG. 2.

FIG. 3 shows mounting plate 104 in greater detail.

Figure 4:
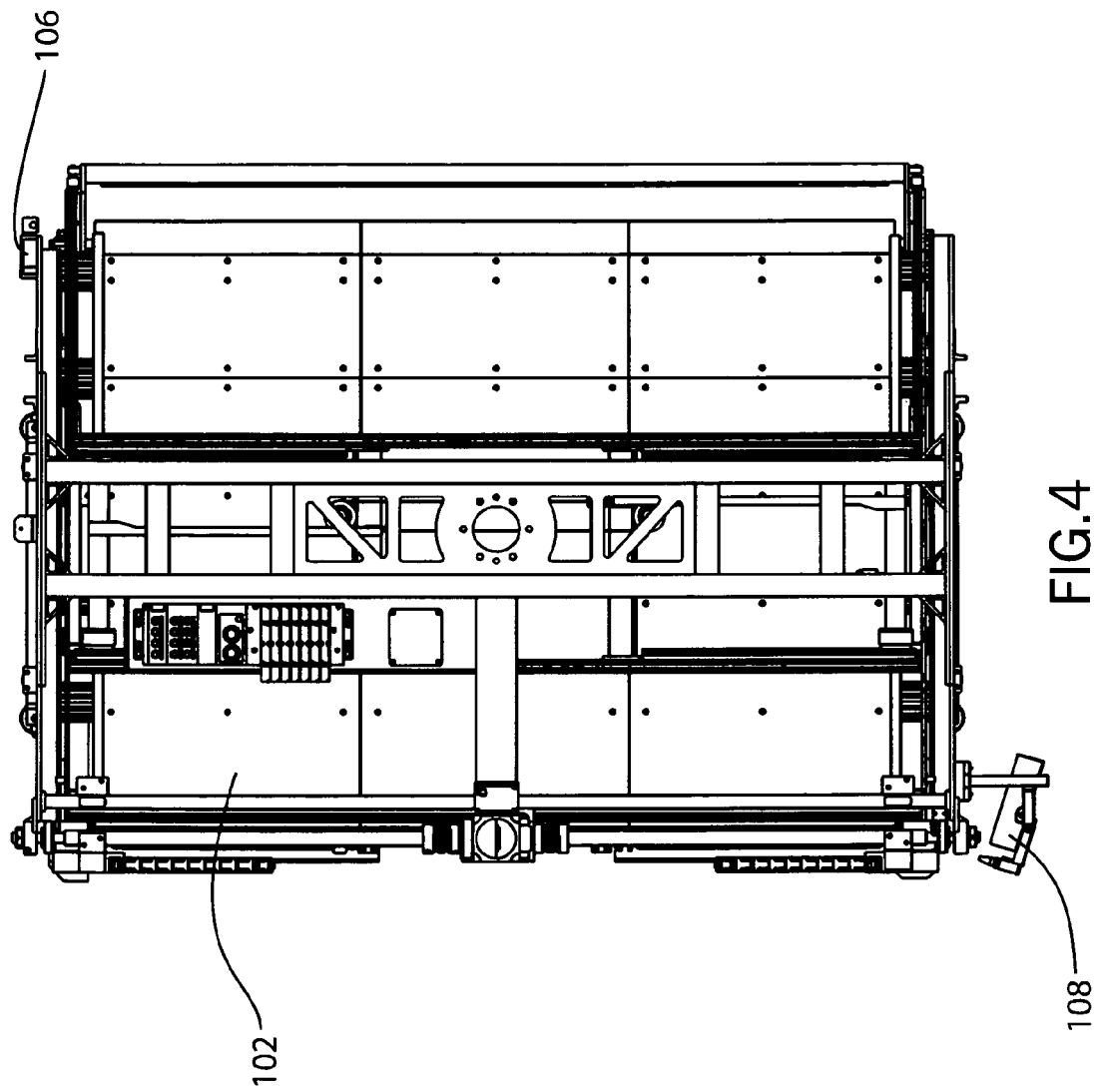
FIG. 4 is a view showing the location of the camera and the light source located on the end-of-arm tool.

FIG. 4 is a view showing the location of the camera and the light source located on the end-of-arm tool. Generally, the camera may be attached to the programmable robot. Preferably, the robot further comprises a cantilevered arm with an end effector and the camera is attached to the end effector.

FIG. 4 is a view showing the location of the camera and the light source located on the end-of-arm tool. In the preferred embodiment, FIG. 4 shows end-of-arm tool as end-effector 102. Camera 106 and light source 108 are attached to end effector 102.

Figure 5:
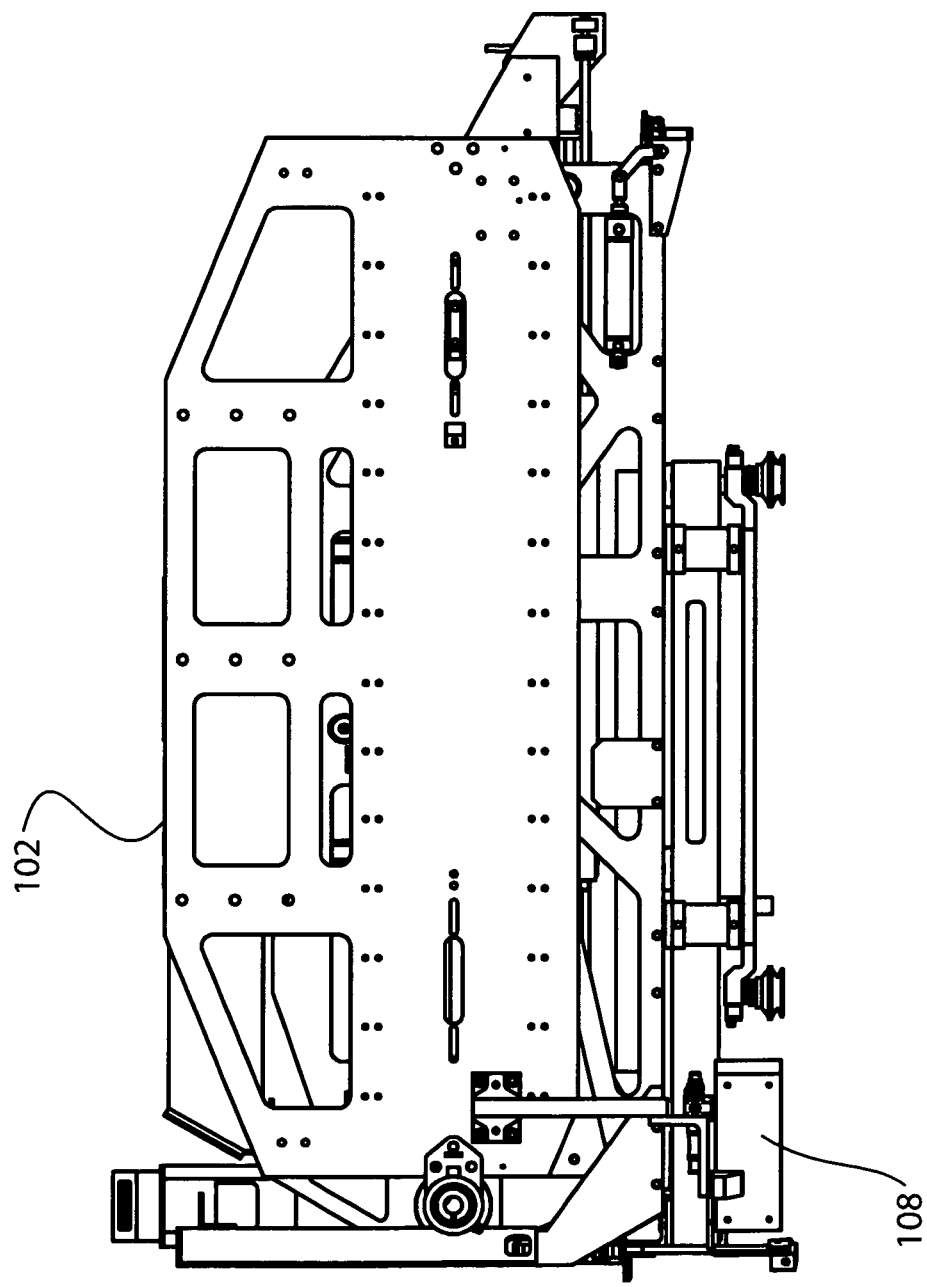
FIG. 5 is an end view of FIG. 4 showing the light source in greater detail.

FIG. 5 is an end view of FIG. 4 showing light source 108 in greater detail.

Figure 6:
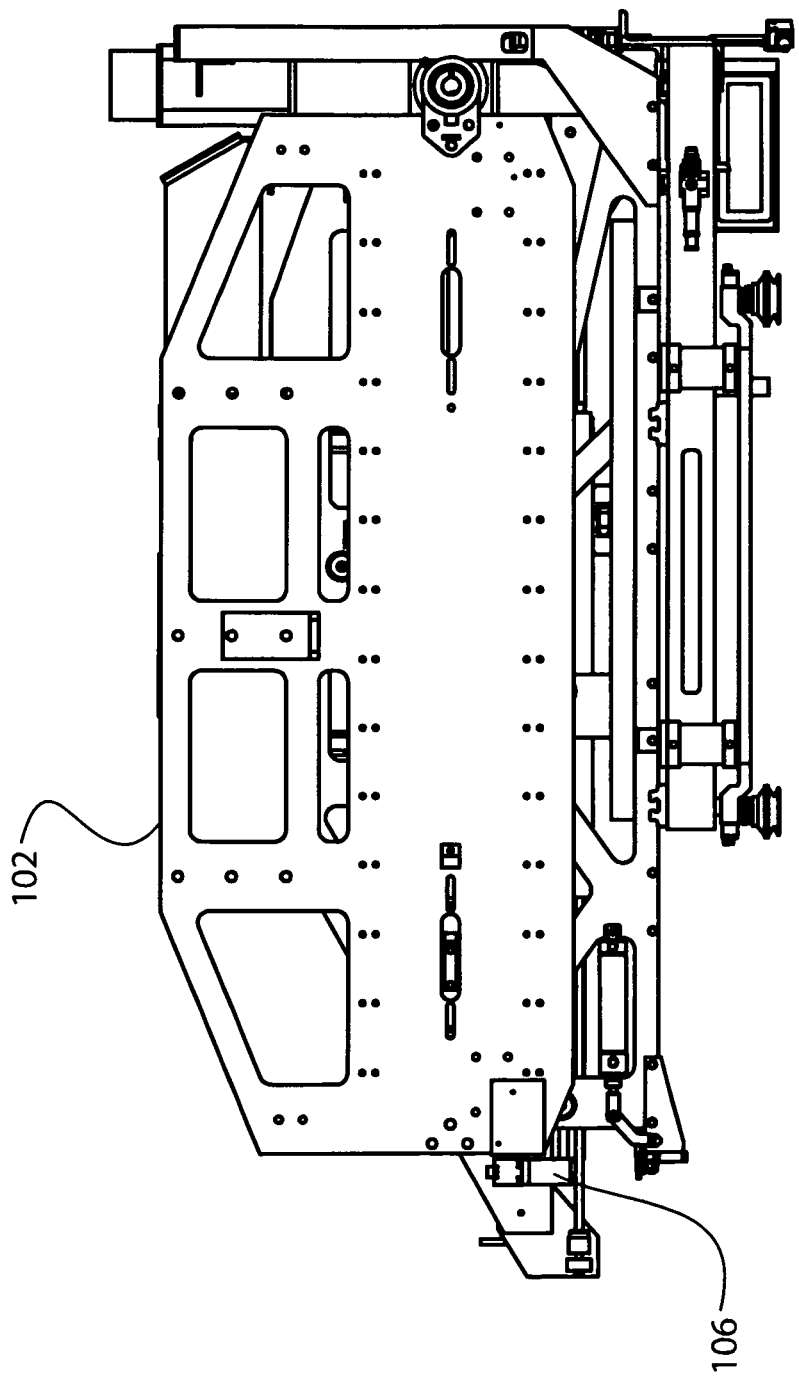
FIG. 6 is an end view of FIG. 4 showing the camera in greater detail.

FIG. 6 is an end view of FIG. 4 showing camera 106 in greater detail.

The vision aided system further comprises the steps of: initiating a plurality of sequential frame grabs; and sequentially feeding dunnage from the dunnage supply line into the load building area by sequentially feeding the dunnage in responses to each frame grab of the plurality. The dunnage supply line comprises at least one pallet, at least one tier sheet, and at least one top frame as necessary to build a load in the load building area. The steps of feeding dunnage comprises the steps of sequentially: placing a pallet in the load building area; alternatively placing a tier sheet and a tier of product on the pallet; stacking alternate layers of the tiers and tier sheets on the pallet in the load building area; and stacking a top frame on the load.

In a second preferred embodiment, the vision aided system is used in building a tier of product where the camera determines any void in the tier of product. Again, the product may be bulk product or cases of product. The vision system further comprises using a light source in combination with using the frame grab to position the programmable robot over the dunnage. Preferably, the light source is an infrared light source. However, the light source also may be a low current diode. Preferably the robot further comprises a cantilevered arm with an end effector, wherein the camera and the light source are attached to the end effector.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A process for palletizing a load comprising the steps of:
providing a dunnage supply line;
providing a load building area;
providing a single programmable robot including a microprocessor and software configured to build a load by sequentially feeding dunnage from the dunnage supply line as necessary to the load building area;
providing a camera positioned over the dunnage supply line;
initiating a frame grab of the dunnage supply line with the camera;
using the frame grab to determine the position of the dunnage;
using the frame grab to position the programmable robot over an individual piece of dunnage;
feeding the dunnage from the dunnage supply line to the load building area;
initiating a frame grab at each step of sequentially feeding dunnage from the dunnage supply line into the load building area;
error proofing the feeding at each step of feeding dunnage by comparing the frame grab to a standard frame grab;
correcting the placing of the dunnage into the load building area in response to the error proofing; and
controlling the steps with the single programmable robot, microprocessor and software.

2. A process according to claim 1 wherein the position of the dunnage is skewed and the controlling is configured to use the frame grab to correctly position the programmable robot over the skewed dunnage.

3. A process according to claim 1 wherein the camera is attached to the programmable robot.

4. A process according to claim 1 wherein the robot further comprises a cantilevered arm with an end effector, wherein the camera is attached to the end effector.

5. A process according to claim 1 further comprising the steps of:
initiating a plurality of sequential frame grabs; and
sequentially feeding dunnage from the dunnage supply line to the load building area by sequentially feeding the dunnage in response to each frame grab of the plurality.

6. A process according to claim 5 wherein the dunnage supply line further comprises at least one pallet, at least one tier sheet, and at least one top frame as necessary to build a load in the load building area.

7. A process according to claim 6 wherein the step of feeding dunnage further comprises the steps of sequentially:
placing a pallet in the load building area;
alternatively placing a tier sheet and a tier of product on the pallet;
stacking alternate layers of the tiers and tier sheets on the pallet in the load building area; and
stacking a top frame on the load.

8. A process according to claim 1 wherein the step of feeding the dunnage comprises the steps of picking and placing the dunnage from the dunnage supply line to the load building area.

9. A process according to claim 1 further comprising the steps of:
building a tier of product; and
using the camera to determine any void in the tier of product.

10. A process of claim 9 wherein the product is bulk product or cases of product.

11. A process according to claim 1 further comprising the step of:
using a light source in combination with using the frame grab to position the programmable robot over the dunnage.

12. A process according to claim 11 wherein the light source is an infrared light source.

13. A process according to claim 11 wherein the light source is a low current diode.

14. A process according to claim 11 wherein the robot further comprises a cantilevered arm with an end effector, wherein the camera and the light source are attached to the end effector.

15. An apparatus for palletizing a load comprising:
a load building area;
a dunnage supply line;
a single programmable robot, including a microprocessor and software configured to build a load by sequentially feeding dunnage as necessary to the load building area from the dunnage supply line;
a camera positioned over the dunnage in the dunnage supply line;
a control that initiates a frame grab of the dunnage in the dunnage supply line with the camera;
a control that correctly positions the single robot over the dunnage in the dunnage supply line in response to the frame grab; and
a control that initiates transferring dunnage from the dunnage supply to the load building area in response to the frame grab;
wherein the control that initiates transferring dunnage is configured to:
initiate frame grabs; at each step of sequentially feeding dunnage from the dunnage supply line into the load building area;
error proof the feeding at each step of feeding dunnage by comparing the frame grab to a standard frame grab; and
correcting the placing of the dunnage into the load building area in response to the error proofing.

16. An apparatus according to claim 15 wherein the position of the dunnage is skewed and the control is configured to use the frame grab to position the programmable robot over the skewed dunnage.

17. An apparatus according to claim 15 wherein the camera is attached to the programmable robot.

18. An apparatus according to claim 15 wherein the robot further comprises a cantilevered arm with an end effector, wherein the camera is attached to the end effector.

19. An apparatus according to claim 15 wherein the control that initiates the frame grab from the camera is configured to initiate a plurality of sequential frame grabs necessary to build a load.

20. An apparatus according to claim 19 wherein the control that initiates transferring dunnage is configured to sequentially transfer dunnage in response to each frame grab of the plurality.

21. An apparatus according to claim 20 wherein the control initiates transferring dunnage is configured to repeat the steps as necessary until a load is built in the load building area.

22. An apparatus according to claim 15 wherein the dunnage line further comprises:
a pallet station;
a tier station; and
a top frame station.

23. An apparatus according to claim 15 wherein the control that initiates transferring dunnage is configured to pick and place the dunnage from the dunnage supply line to the load building area.

24. An apparatus according to claim 15 wherein the control that initiates the frame grab from the camera is configured to determine any void in a tier of product.

25. An apparatus according to claim 24 wherein the product is bulk product or cases of product.

26. An apparatus according to claim 15 further comprising a light source in combination with the camera for positioning the programmable robot over the dunnage.

27. An apparatus according to claim 26 wherein the light source is an infrared light source.

28. An apparatus according to claim 26 wherein the light source is a low current diode.

29. An apparatus according to claim 26 wherein the robot further comprises a cantilevered arm with an end effector, wherein the camera and the light source are attached to the end effector.

30. An apparatus according to claim 15 wherein the microprocessor and software are configured to error-proof the shape of a tier of bottles.

31. An apparatus according to claim 15 wherein the microprocessor and software are configured to error-proof the quantity of cases in a tier of cases.

32. An apparatus according to claim 15 wherein the microprocessor and software are configured to error-proof the location of a case in a tier of cases.

33. An apparatus according to claim 15 wherein the microprocessor and software are configured to error-proof the shape of a tier of cases.

* * * * *